United States Patent Office 3,839,401
Patented Oct. 1, 1974

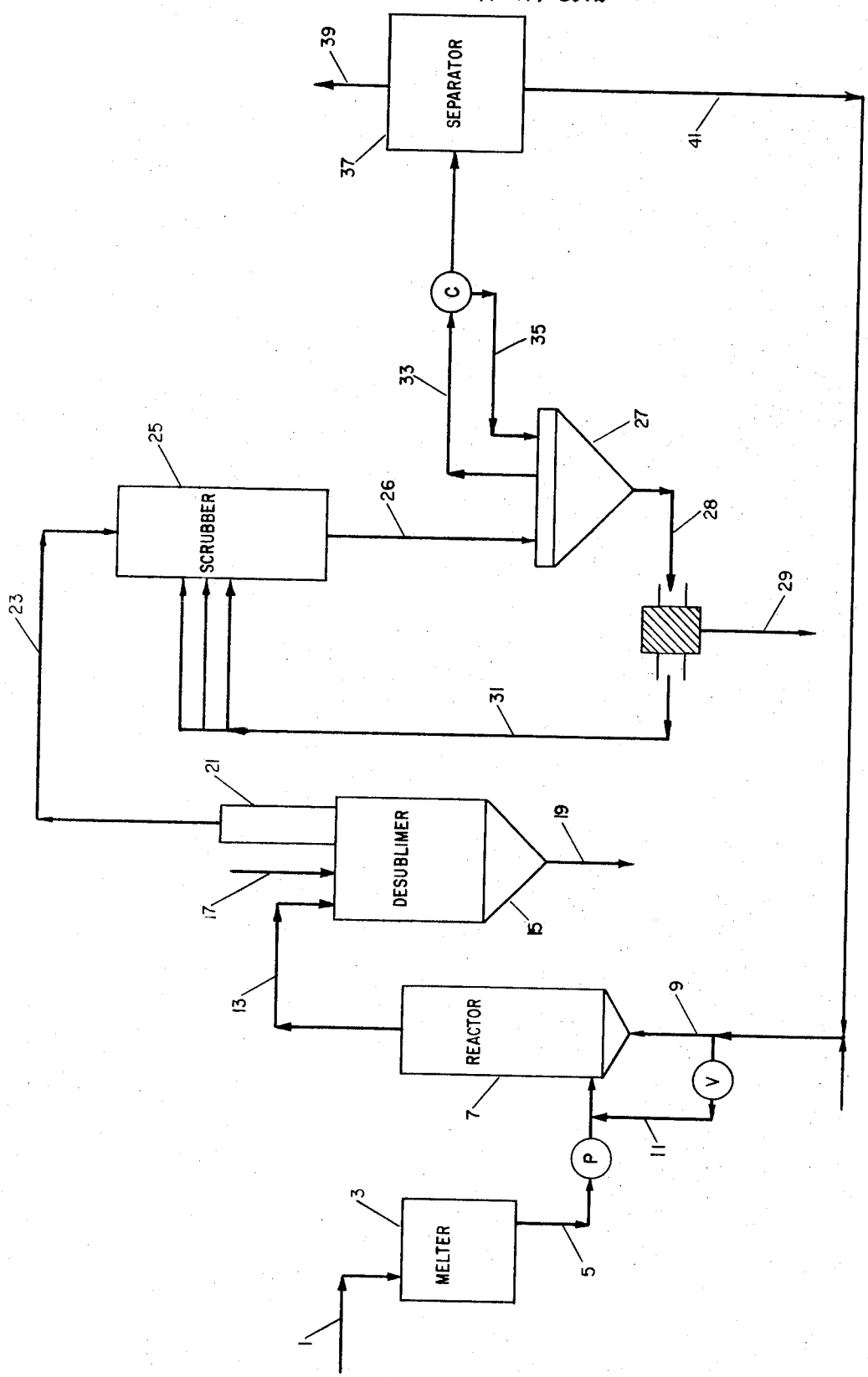

3,839,401
FLUID BED CHLORINATION OF PHTHALONITRILES
Edgar A. Lavergne, North Madison, and Frank S. Mahne, Painesville, Ohio, assignors to Diamond Shamrock Corporation, Cleveland, Ohio
Filed Oct. 17, 1972, Ser. No. 298,348
Int. Cl. C07c *121/56*
U.S. Cl. 260—465 G        14 Claims

ABSTRACT OF THE DISCLOSURE

A phthalonitrile is liquified and fed to a fluid bed reactor wherein it mixes and reacts with gaseous chlorine in the presence of activated carbon. The resultant chlorinated phthalonitrile is then generally desublimed with $CCl_4$ and recovered. Treatment of the residual gas, resulting in recovery of HCl and recycle of unreacted $Cl_2$, is also described. Exemplary is the chlorination of isophthalonitrile to tetrachlorophthalonitrile.

BACKGROUND OF THE INVENTION

The various chlorinated phthalonitriles are extremely useful for their biological activity, as is disclosed, for example, in U.S. Pat. No. 3,290,353. In addition to the methods described in that patent, such materials are typically prepared by the vapor phase reaction of one of the isomeric phthalonitriles with $Cl_2$ in the presence of a catalyst layer, as described in U.S. 3,108,130. While this latter method has seen commercial use when modified for fluid bed operation, a number of disadvantages obtain relating to decomposition of the organic feed at the temperatures required for vaporization, relatively poor conversion efficiencies, equipment corrosion, reactor and feed line fouling from premature reaction of the feed mixture and the like. Since the biological efficacy of chlorinated phthalonitriles dictates quantity usage, an efficient process for their production is required.

STATEMENT OF THE INVENTION

Therefore, it is an object of the present invention to provide a process, simple of maintenance, for the efficient chlorination of phthalonitriles.

It is a further object of the invention to provide a fluid bed process for the production of chlorinated phthalonitriles.

A still further object of the invention is to provide such a process wherein recovery and recycle of unreacted chlorine is readily possible.

These and other objects will become apparent to those skilled in the art from the specification and claims which follow.

There has now been found a process for the production of a chlorinated phthalonitrile which process comprises:

(a) introducing gaseous $Cl_2$ and a molten, atomized, phthalonitrile into a fluidized bed of activated carbon particles maintained at a temperature within the range of 300° to 400° C., at least the majority of the chlorine being separately introduced to the bottom of, and serving to fluidize, the bed, the phthalonitrile being introduced to the bed above the point of $Cl_2$ introduction;

(b) reacting said $Cl_2$ and phthalonitrile therein to the desired chlorinated phthalonitrile;

(c) removing as a gaseous stream the reaction products, by-products, and unreacted materials;

(d) contacting said gaseous stream with a quantity of liquid $CCl_4$ sufficient to desublime substantially all of the chlorinated phthalonitrile while vaporizing substantially all of the $CCl_4$; and (e) recovering solidified, particulate, chlorinated phthalonitrile.

Further, the gaseous stream remaining after desublimation may be scrubbed to remove residual solids, cooled to recover $CCl_4$ and separated into HCl and $Cl_2$, the latter being recycled to the reactor.

The advantages following from the foregoing process are numerous. Feeding a molten, rather than the more conventional vaporous, phthalonitrile substantially reduces loss by decomposition since, in the case of isophthalonitrile for example, a temperature differential of about 100° C. is involved. Substantially separate feed of $Cl_2$ and phthalonitrile materially reduces distributor plate pluggage by prematurely chlorinated materials. Desublimation with $CCl_4$, which is chemically inert in the process, eliminates the corrosion problems attendant water in the presence of HCl. Further, water, the prior desublimation medium, tends to hydrolyze the chlorinated product, therefore lowering its pH to often unacceptable levels. Recycle of unreacted $Cl_2$ is an alternative, obviously more attractive than the caustic absorption often practiced, allowing increased chlorine efficiency.

BRIEF DESCRIPTION OF THE DRAWING

The Figure is a schematic representation of a process of the present invention including recovery and recycle of unreacted chlorine.

DESCRIPTION OF THE PREFERRED EMBODIMENTS

While the invention for the sake of convenience is described by reference to the chlorination of isophthalonitrile to tetrachloroisophthalonitrile, it will be understood that the term "phthalonitrile" contemplates that (ortho)phthalonitrile or terephhalonitrile may also be the reactant, with appropriate temperature variation to account for the difference in melting points, and by adjustment of the $Cl_2$:phthalonitrile feed ratio, a lower chlorinated material, such as a dichlorophthalonitrile may be obtained.

Referring to the Figure, solid isophthalonitrile is introduced via line 1 to the melter 3 wherein it is heated to in excess of its melting point, e.g., 190–210° C. The molten isophthalonitrile is pumped through line 5 to the fluid bed reactor 7 maintained at a temperature between 330° and 370° C. by means of external jacketing and/or internal cooling means (not shown). It should be noted here that the isophthalonitrile must be introduced into the reactor in a finely divided (atomized) form and that this can be accomplished, for example, either with an appropriate nozzle or by means of a gas as described below.

The major portion, e.g., 90%, and sometimes all of the vaporized $Cl_2$ is fed preheated to about the same temperature as the isophthalonitrile, via line 9 to the bottom of reactor 7 wherein it passes through the distributor plate into the bed, fluidizing the activated carbon particles of which the bed is comprised. The molar ratio of $Cl_2$:isophthalonitrile employed is within the range of 4–8:1, preferably 5.0–6.7:1. Obviously, $Cl_2$ must be fed at a rate sufficient to maintain the carbon particles in a fluidized state, a value varying with reactor size and configuration, but generally corresponding to a superficial velocity of 0.2–0.6 foot per second.

If less than the entire amount of $Cl_2$ is fed to the reactor 7 through line 9, the balance, generally about 10% or less, is diverted by means of a valve through line 11 and then into line 5 where it mixes with and so disperses the molten isophthalonitrile as to atomize same before injection into the lower portion of the fluidized bed above the distributor plate. It is preferable that this mixing takes place as near the reactor as possible in order to reduce the residence time of the mixture in line 5 and prevent premature reaction.

Rather than divert a portion of the $Cl_2$ to line 5, and should it still be necessary to atomize the isophthalonitrile, an inert gas, such as $N_2$ or HCl, may be employed in equivalent amounts to the same end. Such a practice is usually less desirable however, since eventual separation from the $Cl_2$ is required.

Following an average reactor residence time of 20 to 40 seconds, the gases, consisting of tetrachloroisophthalonitrile, unreacted $Cl_2$, HCl, and minor amounts of isophthalonitrile, are passed via line 13 to the desublimer 15 wherein they are contacted, preferably, with a spray of liquid $CCl_4$ introduced via line 17, conveniently at ambient temperature. The amount of $CCl_4$ employed should be that required to reduce the product temperature to the point of solidification (desublimation). Use of an excess will result in the desired presence of liquid $CCl_4$ in the product. Obviously this quantity will vary with temperature and production rate, an amount within the range of 1.5 to 2.5 pounds per pound of product being typical. In this manner, the product, for example, tetrachloroisophthalonitrile, may be directly recovered through line 19 at a high degree of purity (e.g., 97%).

Exiting from the desublimer 15 is a gaseous stream comprising $Cl_2$, HCl, $CCl_4$, and small amounts of isophthalonitrile and tetrachloroisophthalonitrile, any entrained solids being removed by means of a bag filter 21. This gaseous stream is conveyed via line 23 to scrubber 25 wherein large amounts of liquid $CCl_4$ impinge thereon, thus removing the last traces of organics, unreacted or not. Flow from scrubber 25 via line 26 into holding vessel 27 results in a body of liquid $CCl_4$ that may be allowed to become saturated with organics. This saturated $CCl_4$ is drawn from holding vessel 27 through line 28, filtered, with solids disposed of through line 29, and recycled to the scrubbing operation, through a heater, via line 31. Alternatively, a portion of the (generally less than saturated) liquid may be drawn through line 28 to an evaporator (not shown) wherein the $CCl_4$ may be distilled off, cooled, and recycled through line 31. Since the scrubbing efficiency is inversely proportional to the degree of $CCl_4$ saturation, treatment of the $CCl_4$ in the holding vessel 27 should be varied as required. The $CCl_4$ used for the actual scrubbing is preferably at a temperature of about 65° C. (±5°). A somewhat lower temperature, about 50° C., obtains in the holding vessel owing to recycle of cooled $CCl_4$ from a later stage.

The gases exiting through line 33 now contain only $Cl_2$, HCl, and $CCl_4$, the latter of which is removed by cooling to about −6° C. and recycled via line 35 to holding vessel 27. In the final separator stage 37, $Cl_2$ and HCl are separated, HCl being removed via line 39 and $Cl_2$ recycled through line 41 to line 9 wherein it is combined with vaporized chlorine as a reactor feed. Chlorine may be separated by cyclic absorption and desorption as is known in the art.

Although it is possible to apply pressure to drive the gases from the desublimer through the $Cl_2$/HCl separation stage, more desirably a slight vacuum, e.g., a negative pressure of 2 to 30 inches of water, is employed.

While reference has been made exclusively to the chlorination of isophthalonitrile to tetrachloroisophthalonitrile, with minor alterations reflecting the differences in physical properties of the isomers, the process applies as well to the production of tetrachlorophthalonitrile. For example, (ortho)phthalonitrile, having a lower melting point, may be heated in melter 3 to a temperature of 150° C. to 170° C. for feed to reactor 7 operating at 300° to 400° C. On the other extreme, the higher melting terephthalonitrile requires melter temperatures of 235° to 250° C. As indicated, lower chlorinated materials are possible if the ratio of chlorine to organic is reduced. For example, at a molar ratio of 2.0 to 2.5:1. a substantially dichlorophthalonitrile product is obtained.

In order that those skilled in the art may more readily understand the present invention and certain preferred embodiments by which it may be carried into effect, the following specific example is afforded.

EXAMPLE

Reference is made to the attached Figure where necessary. Technical grade isophthalonitrile (purity 97%) is fed to the melter 3 wherein it is heated to 200° C. and then pumped to the reactor 7 at a rate of 100 lbs./hr. Chlorine, preheated to 20° C., enters the reactor at a rate of 325 lbs./hr., an amount giving a $Cl_2$:isophthalonitrile mole ratio of 5.4:1. The majority of said chlorine enters the bottom of the reactor and passes through the distributor plate, fluidizing a bed of activated carbon having a particle size range of 100–300 microns, then mixes and reacts with the separate feed of isophthalonitrile (which is atomized with 5% of the $Cl_2$ feed) at a temperature of 350° C., said temperature being maintained by means of an oil jacket.

The gases exiting from the reactor are contacted in the desublimer 15 with a spray of 0.4 gallon/minute $CCl_4$ at a temperature of 20° C., whereupon a particulate product is recovered from the bottom having an analysis of greater than 97% tetrachloroisophthalonitrile and less than 0.5% unreacted isophthalonitrile.

The remaining gases pass to a scrubber 25 wherein a spray of 15 lbs. $CCl_4$, per pound of gas, at a temperature of 65° C. removes the residual tetrachloroisophthalonitrile and unreacted isophthalonitrile, the result being a saturated solution which is filtered to remove solids prior to recycle through the scrubber.

The gas stream now consists of $Cl_2$, HCl, and $CCl_4$, the latter of which is removed by cooling to −6° C. and recycled to the scrubber.

The chlorine and HCl are now passed through liquid $CCl_4$, which acts to absorb the $Cl_2$, the HCl then being absorbed in water. Finally, the $Cl_2$ is stripped from the $Cl_4$ for recycle to the reactor.

The overall isophthalonitrile efficiency is determined to be 94%. The process operates with a minimum of down time for reactor cleaning. Desublimer corrosion is not found.

While the invention has been described by reference to certain preferred embodiments thereof, it is not to be so limited, as will be apparent from the scope of the appended claims.

We claim:

1. A process for the production of a chlorinated phthalonitrile which process comprises:
   (a) introducing gaseous $Cl_2$ and a molten, atomized, phthalonitrile into a fluidized bed of activated carbon particles maintained at a temperature within the range of 300° to 400° C., at least the majority of the chlorine being separately introduced to the bottom of, and serving to fluidize, the bed, the phthalonitrile, together with any remaining $Cl_2$, being introduced to the bed above the point of introduction of said majority of $Cl_2$;
   (b) reacting said $Cl_2$ and phthalonitrile therein to the desired chlorinated phthalonitrile;
   (c) separating and recovering the resultant chlorinated phthalonitrile; and
   (d) recovering solidified, particulate, chlorinated phthalonitrile.

2. A process as in Claim 1 wherein the molten phthalonitrile is isophthalonitrile and is introduced at a temperature of about 190° to 210° C.

3. A process as in Claim 1 wherein 90 to 100% of the $Cl_2$ is introduced to the bottom of the bed.

4. A process as in Claim 1 wherein the mole ratio of $Cl_2$ to phthalonitrile fed is 5.0–6.7:1.

5. A process as in Claim 1 wherein any balance of the $Cl_2$ not separately introduced is mixed with molten phthalonitrile immediately prior to introduction into the bed and serves to atomize same.

6. A process as in Claim 1 wherein the reaction is at a temperature between 330° and 370° C.

7. A process for the production of a chlorinated phthalonitrile which process comprises:

(a) introducing gaseous $Cl_2$ and a molten, atomized, phthalonitrile into a fluidized bed of activated carbon particles maintained at a temperature within the range of 300° to 400° C., at least the majority of the $Cl_2$ being separately introduced to the bottom of, and serving to fluidize, the bed, the phthalonitrile, together with any remaining $Cl_2$, being introduced to the bed above the point of introduction of said majority of $Cl_2$;

(b) reacting said $Cl_2$ and phthalonitrile therein to the desired chlorinated phthalonitrile;

(c) removing as a gaseous stream the reaction products, by-products, and unreacted materials;

(d) contacting said gaseous stream with a quantity of liquid $CCl_4$ sufficient to desublime substantially all of the chlorinated phthalonitrile while vaporizing substantially all of the $CCl_4$.

8. A process as in Claim 7 wherein the temperature of the liquid $CCl_4$ in the desublimation step is ambient.

9. A process as in Claim 7 wherein the phthalonitrile is isophthalonitrile and the product is tetrachloroisophthalonitrile.

10. A process for the production of a chlorinated phthalonitrile which process comprises:

(a) introducing gaseous $Cl_2$ and a molten, atomized, phthalonitrile into a fluidized bed of activated carbon particles maintained at a temperature within the range of 300° to 400° C., at least the majority of the $Cl_2$ being separately introduced to the bottom of, and serving to fluidize, the bed, the phthalonitrile, together with any remaining $Cl_2$, being introduced to the bed above the point of introduction of said majority of $Cl_2$;

(b) reacting said $Cl_2$ and phthalonitrile therein to the desired chlorinated phthalonitrile;

(c) removing as a gaseous stream the reaction products, by-products, and unreacted materials;

(d) contacting said gaseous stream with a quantity of liquid $CCl_4$ sufficient to desublime substantially all of the chlorinated phthalonitrile while vaporizing substantially all of the $CCl_4$;

(e) recovering solidified, particulate, chlorinated phthalonitrile;

(f) removing a gaseous stream containing unreacted $Cl_2$, HCl, $CCl_4$, and small amounts of phthalonitrile and chlorinated phthalonitrile from the desublimer;

(g) scrubbing said gaseous stream with liquid $CCl_4$ to remove the phthalonitrile and chlorinated phthalonitrile;

(h) cooling the resultant gaseous stream containing $CCl_4$, $Cl_2$, and HCl to remove said $CCl_4$; and (i) separating the HCl from the $Cl_2$.

11. A process as in Claim 10 wherein the $Cl_2$ from step (i) is recycled to step (a).

12. A process as in Claim 10 wherein the liquid $CCl_4$ used to scrub the gaseous stream is at a temperature of from 60° to 70° C.

13. A process as in Claim 10 wherein steps (d) through (i), except (e), are conducted at a negative pressure of 2 to 30 inches of water.

14. A process for the production of tetrachloroisophthalonitrile which process comprises:

(a) introducing gaseous $Cl_2$ and molten, atomized, isophthalonitrile at a temperature of about 200° C. into a fluidized bed of activated carbon particles maintained at a temperature of about 350° C., about 90% of the $Cl_2$ being separately introduced to the bottom of, and serving to fluidize, the bed, the isophthalonitrile and the remaining $Cl_2$ being introduced to the bed above the point of $Cl_2$ introduction;

(b) reacting the $Cl_2$ and isophthalonitrile therein to the desired tetrachloroisophthalonitrile;

(c) removing a gaseous stream consisting essentially of tetrachloroisophthalonitrile, HCl, $Cl_2$, and unreacted isophthalonitrile;

(d) contacting said gaseous stream with a quantity of liquid $CCl_4$, at about ambient temperature, sufficient to desublime substantially all of the tetrachloroisophthalonitrile while vaporizing substantially all of the $CCl_4$;

(e) recovering solidified particulate tetrachloroisophthalonitrile;

(f) removing from the desublimer a gaseous stream consisting essentially of HCl, $Cl_2$, $CCl_4$, and small amounts of isophthalonitrile and tetrachloroisophthalonitrile;

(g) scrubbing said gaseous stream with liquid $CCl_4$ at about 65° C. to remove the remainder of isophthalonitrile and tetrachloroisophthalonitrile;

(h) cooling the resultant gaseous stream to condense and recover $CCl_4$;

(i) separating the $Cl_2$ and HCl; and (j) recycling the $Cl_2$ from step (i) to step (a).

References Cited
UNITED STATES PATENTS 3,108,130  10/1963  Haga et al. _____ 260—465

LEWIS GOTTS, Primary Examiner

D. H. TORRENCE, Assistant Examiner

UNITED STATES PATENT OFFICE
CERTIFICATE OF CORRECTION

Patent No. 3,839,401     Dated October 1, 1974

Inventor(s) Edgar A. Lavergne and Frank S. Mahne

It is certified that error appears in the above-identified patent and that said Letters Patent are hereby corrected as shown below:

Col. 3, line 16, cancel "desired", substitute --undesired--.

Col. 4, line 39, cancel "$Cl_4$", substitute --$CCl_4$--.

Signed and sealed this 3rd day of December 1974.

(SEAL)
Attest:

McCOY M. GIBSON JR.
Attesting Officer

C. MARSHALL DANN
Commissioner of Patents